United States Patent
Cremers et al.

(10) Patent No.: US 10,081,300 B2
(45) Date of Patent: Sep. 25, 2018

(54) ORIENTATION FOR VISUALLY IMPAIRED PASSENGERS ON-BOARD A VEHICLE

(71) Applicant: Airbus Operations GmbH, Hamburg (DE)

(72) Inventors: Joerg Cremers, Hamburg (DE); Christian Seibt, Hamburg (DE); Jens Wiebalck, Hamburg (DE)

(73) Assignee: Airbus Operations GmbH (DE)

( * ) Notice: Subject to any disclaimer, the term of this patent is extended or adjusted under 35 U.S.C. 154(b) by 294 days.

(21) Appl. No.: 14/322,150

(22) Filed: Jul. 2, 2014

(65) Prior Publication Data

US 2015/0015024 A1    Jan. 15, 2015

(30) Foreign Application Priority Data

Jul. 9, 2013    (EP) .................................... 13175760

(51) Int. Cl.
*G09B 19/00* (2006.01)
*B60Q 9/00* (2006.01)
(Continued)

(52) U.S. Cl.
CPC ............ *B60Q 9/00* (2013.01); *B64D 11/00* (2013.01); *B64D 45/00* (2013.01); *G09B 21/003* (2013.01); *G09B 21/007* (2013.01); *G09B 21/008* (2013.01)

(58) Field of Classification Search
CPC .. B64D 11/00; B64D 45/00; B64D 2045/007; B60Q 9/00; G09B 21/003; G09B 21/007; G09B 21/008
(Continued)

(56) References Cited

U.S. PATENT DOCUMENTS 3,408,025 A * 10/1968 Davis ...................... A62B 3/00
                                                        182/230
5,284,444 A    2/1994 Raynes
(Continued)

FOREIGN PATENT DOCUMENTS

CA          874554 A    6/1971
CN       101242994 A    8/2008
(Continued)

OTHER PUBLICATIONS

Dippel, Kimberly, "Human Factors Analysis on Creating an Inclusive Aircraft Lavatory Environment for Blind and Visually Impaired People", Hochschule für Angewandte Wissenschaften Hamburg Fakultät Technik und Informatik Department Fahrzeugtechnik + Flugzeugbau, Feb. 29, 2012.*

(Continued)

*Primary Examiner* — James Hull
(74) *Attorney, Agent, or Firm* — Lerner, David, Littenberg, Krumholz & Mentlik, LLP (57) ABSTRACT

To provide an improved guiding of visually impaired passengers on-board a vehicle, a vehicle guidance system for guiding visually impaired passengers on-board a vehicle includes an interior space on-board the vehicle with at least one cabin zone at least one movement area and at least one seating zone located in the cabin interior space, and at least one guiding handrail. The guiding handrail is mounted at least along a part of the cabin zone in the vicinity of the movement area. The guiding handrail is a tactile guide, along which a passenger can be guided for movement within the cabin zone by a touching contact with the guiding handrail. The guiding handrail is provided with visually highlighted information and manually touchable information, both related to cabin information. The guiding handrail (Continued)

is mounted above the seating zone, and within reach of a passenger present in the adjacent movement area.

12 Claims, 4 Drawing Sheets

(51) Int. Cl.
*B64D 11/00* (2006.01)
*B64D 45/00* (2006.01)
*G09B 21/00* (2006.01)

(58) Field of Classification Search
USPC .................................................. 434/112, 113
See application file for complete search history.

(56) References Cited

U.S. PATENT DOCUMENTS

| | | | | |
|---|---|---|---|---|
| 5,331,918 | A | * | 7/1994 | Honigsbaum ............ A62B 3/00 116/205 |
| 5,347,434 | A | * | 9/1994 | Drake .................. B60Q 3/0233 244/118.5 |
| 5,366,050 | A | * | 11/1994 | Raynes ................ G09B 21/003 182/18 |
| 5,612,665 | A | | 3/1997 | Gerhardsen |
| 5,810,597 | A | | 9/1998 | Allen, Jr. et al. |
| 6,754,917 | B1 | | 6/2004 | Rhoades |
| 2006/0248762 | A1 | * | 11/2006 | Moore .................. G09B 19/00 40/584 |
| 2008/0219012 | A1 | | 9/2008 | Kessler et al. |
| 2010/0192435 | A1 | * | 8/2010 | Miscamble .......... G09B 21/003 40/618 |
| 2013/0001359 | A1 | | 1/2013 | Schliwa et al. |

FOREIGN PATENT DOCUMENTS

| | | | |
|---|---|---|---|
| CN | 102762455 | A | 10/2012 |
| DE | 10 2005 039 651 | A1 | 3/2007 |
| DE | 10 2011 109390 | A1 | 2/2013 |
| JP | 2001 299646 | A | 10/2001 |
| JP | 2002219078 | A | 8/2002 |
| JP | 200397005 | A | 4/2003 |
| JP | 2003097005 | A * | 4/2003 |
| JP | 2005 016287 | A | 1/2005 |
| JP | 2005 226230 | A | 8/2005 |
| JP | 2006 255143 | A | 9/2006 |
| JP | 2011 152233 | A | 8/2011 |
| KR | 2012 0115678 | A | 10/2012 |
| KR | 101240599 | B1 | 3/2013 |
| WO | 2011/086502 | A1 | 7/2011 |

OTHER PUBLICATIONS

U.S. Appl. No. 14/322,175, filed Jul. 2, 2014.
"Able data", Raynes Rail (http://www.abledata.com/abledata.cfm?pageid=19327&top=32589&ksectionid=1932 . . . Jun. 14, 2013).
BrailleWise Aircraft Toilet, Hong Kong Polytechnic University, Technology Frontier, Issue Jan. 2013.
"Raynes Rail" (Coco Raynes Associates, Inc.) <http://www.raynesassociates.com/universal-design-raynes-rail-braille-rail 14.06. 2013>.
Safety Dot—Braille Indications for Staircase Handrail by Monocomplex & Jungjoo . . . <http://www.yankodesign.com/2011/03/28/handrails-that-speak/> Jun. 14, 2013.
Institute for Entrepreneurship. PolyU—Technology Frontier <http://www.polyu.edu.hk/ife/corp/en/publications/tech_front.php?tfid=4355> Jun. 14, 2013.
EP 13175757.7 Extended European Search Report dated Sep. 30, 2013.
EP 13175760.1 Extended European Search Report dated Jan. 28, 2014.

\* cited by examiner

ORIENTATION FOR VISUALLY IMPAIRED PASSENGERS ON-BOARD A VEHICLE

FIELD OF THE INVENTION

The present invention relates to guiding and providing orientation for visually impaired passengers on-board a vehicle, and relates in particular to a vehicle guidance system for guiding visually impaired passengers on-board a vehicle, to a vehicle, and to a method for guiding visually impaired passengers on-board a vehicle, as well as to a use of a vehicle guidance system on-board an aircraft.

BACKGROUND OF THE INVENTION

Persons with limitations in relation with their eyesight, for example blind persons and visually impaired persons, have difficulties when being situated in a new location, such as when entering a vehicle for travelling purposes, for example. Due to the limited or even non-existing eyesight, these users, i.e. these passengers, orient themselves for example by a blindman's stick. Another way of orientation is to rely on acoustic impression. However, in relation with getting on-board a vehicle, for example when embarking and disembarking a train or aircraft, visually impaired persons are confronted with a stressful situation, since these moments are rather hectic, because usually a large number of persons want to enter or exit the vehicle at the same time, which time, in addition, is usually rather limited. For a better service, visually impaired persons may thus be guided by a personal guide, for example, when getting on-board an aircraft. For further support, airlines often allow visually impaired persons, or other handicapped passengers, to enter the aircraft in advance before the usual boarding process starts. However, such boarding processes are not regulated in the same way, for example, in rail traffic or in subways or other tram traffic. A particular challenge for visually impaired passengers is finding the right location on-board the vehicle and the particular services provided, which are regularly located at a number of differing places.

BRIEF SUMMARY OF THE INVENTION

There may be a need to provide an improved guiding of visually impaired passengers on-board a vehicle.

It should be noted that the following described aspects of the invention apply also for the vehicle guidance system for guiding visually impaired passengers on-board a vehicle, for the vehicle, and for the method for guiding visually impaired passengers on-board a vehicle, as well as for the use of a vehicle guidance system on-board an aircraft.

According to the present invention, a vehicle guidance system for guiding visually impaired passengers on-board a vehicle is provided. The vehicle guidance system comprises an interior space on-board the vehicle with at least one cabin zone. The vehicle guidance system further comprises at least one movement area and at least one seating zone located in the cabin interior space, and at least one guiding handrail. The guiding handrail is mounted at least along a part of the cabin zone in the vicinity of the movement area. The guiding handrail is a tactile guide, along which a passenger can be guided for movement within the cabin zone by a touching contact with the guiding handrail. The guiding handrail is provided with visually highlighted information related to cabin information. The guiding handrail is further provided with manually touchable information related to cabin information. The guiding handrail is mounted above the seating zone, and is also mounted within reach of a passenger present in the adjacent movement area.

This provides the advantage that a user, while being situated or moving along in the movement area, can grasp the guiding handrail that provides him or her with sufficient information about, for example, the location within the vehicle, such as seat row and seat number, or direction of restaurant or lavatory, etc. By providing the handrail above the seating zone, the handrail can be provided as a continuous handrail facilitating the guidance of the passenger grasping and touching the handrail for being guided along. Because the handrail is located above the seating zone, the seating zone itself is not further disturbed, because the seating zone can be, for example, entered below without meaning any substantial restriction for passengers in their seating procedure. Similarly, passengers can always get up from their seat to move along the movement area, because the handrail is located above. In other words, the handrail is located at a quite unusual location, namely not as a handrail in the common sense, but is moved further up, which on the one hand of course means a certain restriction in terms of reachability, but which on the other hand allows the arrangement of a continuous handrail for a better guidance. Thus, a cabin space can be provided with a guidance that the user can reach to throughout the whole cabin space, which, with regard to the vehicle, is commonly arranged in a longitudinal manner, i.e. as a longitudinal space, which makes the arrangement of the continuous guidance throughout the longitudinal cabin space even more important. The user is thus not guided, as for example on platforms of a train station, by providing guidance in the floor area, which information can either be "felt" by the user walking on the respectively shaped surfaces, or by "feeling" the relief-like structures on the floor with a handheld blindman's stick. Such stick would not be so suitable on-board an aircraft or train or coach, or other vehicle, due to the usually narrow and small spatial situations on-board of vehicles.

The vehicle guidance system (VGS) is also referred as vehicle on-board orientation system (VOOS) or on-board guidance system (OGS). Since the vehicle guidance system also provides orientation for the passenger, the system is also referred to as guiding and orientation system (GOSY).

In an example, the vehicle is an aircraft. In another example, the vehicle is a coach. In a further example, the vehicle is a railway carriage or tram/streetcar. In a still further example, the vehicle is a ship, e.g. a passenger ferry, or other commuting ship used in areas with a large number of water traffic, for example canals in a city.

The term "visually impaired passengers" relates to passengers with reduced or limited eyesight, to blind or nearly blind passengers. The term "visually impaired passengers" also relates to passengers with reduced mobility due to various reasons. The term "visually impaired passengers" relates in particular to handicapped persons. The term also relates to elderly persons and other passengers who experience the feeling of uncertainty and anxiety when onboard a vehicle, e.g. on board an aircraft. The term thus relates to persons with limitations, which are also called special user groups.

The "guiding handrail" relates to a (guiding) rail that provides manually tactile information for guidance purposes. The rail, i.e. the "guiding handrail", is thus also referred to as "manual tactile rail".

The term "within reach" relates to an ergonomic convenient position for an average passenger. For example, the passenger can touch or hold the guiding handrail without having to leave the movement area In an example, the rail, i.e. the "guiding handrail", is a rail touchable with the fingers for perceiving the information. The guiding rail is thus also referred to as "guiding fingertip rail".

In another example, the rail, i.e. the "guiding handrail", is a rail that the user can hold to, while, of course, the rail is also touchable with the hands and fingers for perceiving the information. Thus, the term "guiding handrail" is used. Further, the rail is referred to as "guiding handhold" (see also below).

The term "movement area" relates to zones within the cabin provided for moving of passengers, for example for embarking and disembarking, or in order to get to their seats and to restrooms. The movement area is also referred to as moving area. In an example, the "movement areas" comprise aisle zones or corridor zones arranged between seats. The "movement areas" may also, or alternatively, comprise door areas in the vicinity of a fuselage door. The "movement areas" may also comprise corridor zones between seat rows leading to emergency exits in the fuselage. The "movement areas" may also comprise movement or action zones in a pantry or in relation and/or inside sanitary rooms. For example, the movement area is an aisle zone.

The "visually highlighted information" relates to information provided, for example, with enhanced contrast to the surrounding surface portions. For example, information is presented in a field with a bright colour such that a visually impaired person can see the field as an important field from a distance as an orientation, and can than look closer for the information indicated. The information may be seat/row numbers, location information for special functions, such as where cushions or newspapers are stored, or direction indicators for service areas, such as restrooms, bar or kitchen areas, or sleeping compartments, or restaurants.

The "manually touchable information" relates to information that is communicated to the passenger by feeling and touching a respectively provided surface. In an example, the surface is provided with a coded relief, such as the Braille system, or with symbols that can be perceived by feeling and touching.

The term "cabin information" relates to information about the provision of functional and service elements in the cabin space, for example. The "cabin information" is provided to the passenger in order to help him/her in orientation in the cabin and to find functional, comfort or safety features and functions in the cabin.

In an example, the information related to cabin information is a seat indicator. In an example, the cabin information is provided as cabin location information, e.g. seat indicators comprising seat and row numbers for identifying a location of a seat. The seat indictor is provided as a relief or contour of an Arabic number and/or Latin letter, for example. The seat indicator is also provided as a coded relief, such as the Braille system.

According to an example, the seating zone comprises a seating arrangement with a plurality of seat rows and columns and at least one longitudinally arranged aisle. Further, an overhead compartment arrangement is provided with a plurality of stowage receptions arranged above at least a part of the seating arrangement. The guiding handrail is provided above the seating zone along a front edge of an overhead compartment arrangement facing towards the movement area.

This provides the advantage that the guidance handrail can be integrated and combined with the cabin layout, for example in a visual sense, but also in a constructive sense. For example, the guiding handrail is mounted to the overhead compartment. As an overhead compartment arrangement, enclosable stowage bins may be provided, or open stowage receptions. Since the stowage compartments need some structural support for bearing the load of luggage or other passenger's items that can be stowed in the overhead compartments, this supportive structure can also be used for supporting the guiding handrail.

In an example, the stowage receptions are referred to as overhead compartments, which are also referred to as hatrack.

According to an example, the guiding handrail is also provided at surfaces of other cabin interior elements, which surfaces are facing towards the movement area.

Thus, the user can also be guided along zones where the seating zone is replaced by other equipment or interior structure in the cabin.

According to an example, the guiding handrail is mounted in vicinity and along the whole length of the movement area.

Therewith, the passenger can be guided along his or her complete movement path along the vehicle, such that it is avoided that the passenger feels "lost", which would be the case in the absence of a guidance system.

According to an example, the interior space further comprises a service zone with movement areas comprising at least one of the group of on-board kitchen areas, toilets, washrooms, restrooms, and monuments. The guiding handrail is provided also at wall surfaces along a part of the movement areas of the service zone as a continuation of the guiding handrail along the seating zone.

Thus, a guidance system is provided that extends not only along the cabin space where seating is provided, but also in other areas where otherwise orientation may become difficult to visually impaired passengers.

According to an example, the tactile guide is provided as a continuous tactile guide throughout the cabin space.

This provides a continuous guiding system for the user, i.e. for the visually impaired passenger, which further improves the provision of orientation and information to such passengers. For example, a visually impaired passenger can grasp the handrail when entering the vehicle, i.e. when entering the cabin space, and is then guided along his or her complete path on-board the vehicle. Similar is the case with regard to the exiting of a passenger, where he or she is also guided from the seat, or other location on-board the vehicle, to the exit of the vehicle. Therefore, a safety improvement and also improvement of comfort is provided to visually impaired passengers.

According to an example, the location indicator on the guiding handrail is provided as a user interface provided with an actuator that can be manually activated by the passenger. Upon activation, the user interface provides a predetermined signal to an output unit providing assigned additional information to the passenger.

For example, the location indicator is a seat indicator, and the actuator can be provided by the seat indicator. For example, the location indicator is a direction indicator of on-board service units. For example, in a lavatory the location indicator is an indicator for functions of the lavatory, such as flushing, light, ventilator, water-tap or soap, hand dryer, and the actuator can be provided by the indicator itself. In a further example, the assigned additional information is predetermined information.

This further supports the transmission or perception of information to the user.

In an example, the additional information is provided such to be perceived in a tactile form, for example by vibrations or other rather small movements, nevertheless providing direction information or other information.

According to an example, the output unit is a loudspeaker providing acoustic information in addition to the visual and tactile information. In one example, the loudspeaker is provided as an on-board loudspeaker in the close vicinity of the actuator. In another example, alternatively or additionally, the loudspeaker is provided remote from the actuator arranged with the passenger. For example, the loudspeaker is provided as a part of a passenger's hearing aid. Alternatively, or additionally, the loudspeaker is provided by a passenger's personal handheld communication device, for example a smartphone or other electronic equipment being capable or wireless communication. The additional information may be provided as one tone or a number of tones, such as melodies etc., or as spoken words. For example, the loudspeaker in the vicinity of the actuator may be provided as a directional loudspeaker with a sound field directed towards the place where the user can be expected actuating the actuator. Further, the loudspeaker's signal can be provided rather silent, since visually impaired passengers usually have a highly trained and thus highly sensible hearing sense.

The provided acoustic information may be the same information that is visual to a normal passenger, i.e. a passenger without visual impairment, or the acoustic information can also comprise additional information, which is not "readable".

According to an example, the guiding handrail is also provided as a handhold for passengers.

The handhold is provided as a bar or strut, such that the user can grasp the handhold with the hand. The diameter of the bar or strut is dimensioned according to an average passenger, for example by a 50 percentile male. As a further reference passenger, a 95 percentile male is referred to for determining the dimension of the rail.

The term "50 (or 95) percent male" is used as definition in the field of anthropometry, i.e. measurements of human individuals. The "50 (95) percent male" is also referred to as 50th (95th) percentile and relates to body measurements of individuals where only 50% (5%) are larger, i.e. 50% (95%) stay within the measurements/figures. The exact figures can be taken from, for example, standard definitions such as in the NASA standard 3000T or other norms, for example EN ISO 7250 or DIN 33402.

The term "handhold" refers to the fact that a user can actually hold him- or herself, i.e. the guiding handrail is capable of supporting the complete, or nearly complete weight of a passenger. Thus, an additional improvement with regards to safety is provided, since such a handrail can also act as a supporting handle bar also for other passengers.

According to the invention, also a vehicle is provided that comprises a vehicle structure, a cabin arrangement provided by the vehicle structure, and a guidance for visually impaired passengers on-board the vehicle. The guidance is provided as a vehicle guidance system according to one of the above-described examples. Further, the at least one cabin zone with the at least one movement area (of the vehicle guidance system) is provided by the cabin arrangement.

According to an example, the vehicle is a passenger aircraft, comprising a fuselage structure enclosing the at least one cabin space.

As mentioned above, the vehicle is also provided as a coach (bus), railway carriage or tram/streetcar, or ship.

According to the invention, also a method for guiding visually impaired passengers on-board a vehicle is provided. The method comprises the followings steps:

a) providing a guiding handrail in a cabin space of a vehicle at least along a part of a cabin zone in the vicinity of a movement area, wherein the guiding handrail is a tactile guide with visually highlighted and manually touchable information related to cabin information, wherein the guiding handrail is mounted above a seating zone, and wherein the guiding handrail is mounted within reach of a passenger present in the adjacent movement area;

b) touching of the guiding handrail by a passenger; and c) perceiving the information related to cabin information by manual sensing, thereby providing guiding information.

According to an example, in step b), the passenger feels and manually activates a user interface provided by an actuator on the guiding handrail, and a step d) is provided, in which, upon activation, the user interface is providing a predetermined signal to an output unit; and a step e) is provided, in which the output unit is providing assigned additional information to the passenger.

According to the present invention, also a use of a vehicle guidance system according to one of the above-described examples on-board an aircraft is provided.

According to an aspect of the invention, a handrail is provided as a guidance system in form of providing tactile information, i.e. information that is manually touchable, as well as visually highlighted information, both related to cabin information. The linear guiding element, along which the user can move while keeping in touch with the guiding rail, is arranged above the seating area in order orientation allow the arrangement over at least a number of seats to provide an ongoing guiding aid for visually impaired passengers. The arrangement above the seats also provides the advantage that a user, while searching for the guiding rail in a touching manner with the hands is not distracted by other equipment, which would be the case in the arrangement of a tactile guide in the height of a usual handrail or bar, since in this height, approximately table height, a large number of other equipment is provided, such as seats. By arranging the guide above the seats in a height above the heads of passengers sitting in the seats, it is further avoided that a user, when searching the guide or even when being guided along the guide, intervenes with other passengers already located in the seats. In other words, by arranging the guide in an upper area, the user's hand being guided along the guide is moved out of a zone where he or she could touch another passenger's body or head. This provides further improvement for the situation of the visually impaired passenger being afraid of disturbing other passengers in an unwanted manner.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION

Figure 1:
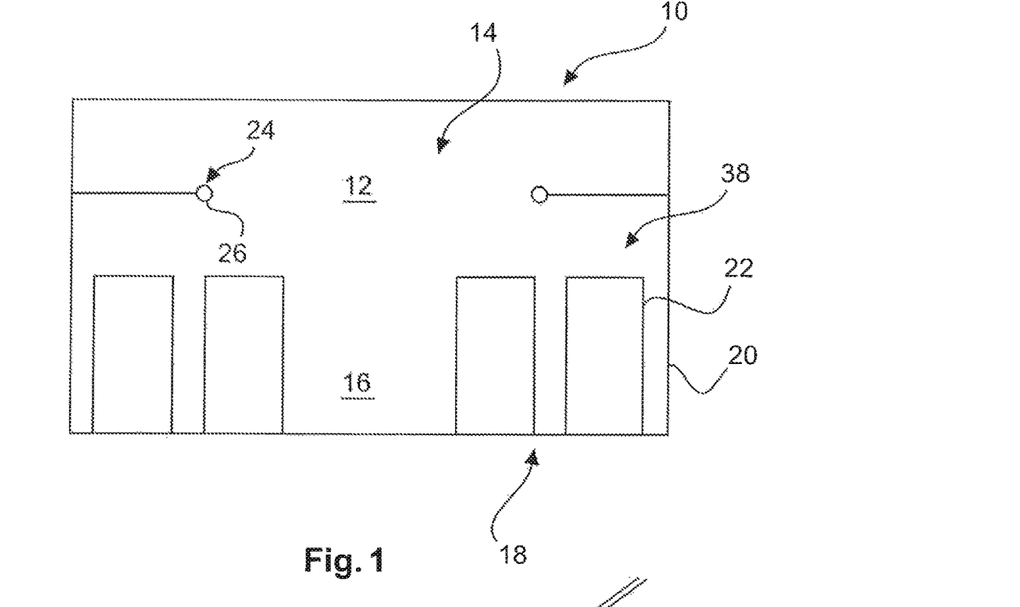
FIG. 1 shows a schematic vertical cross-section through an example of a vehicle guidance system.
Figure 2:
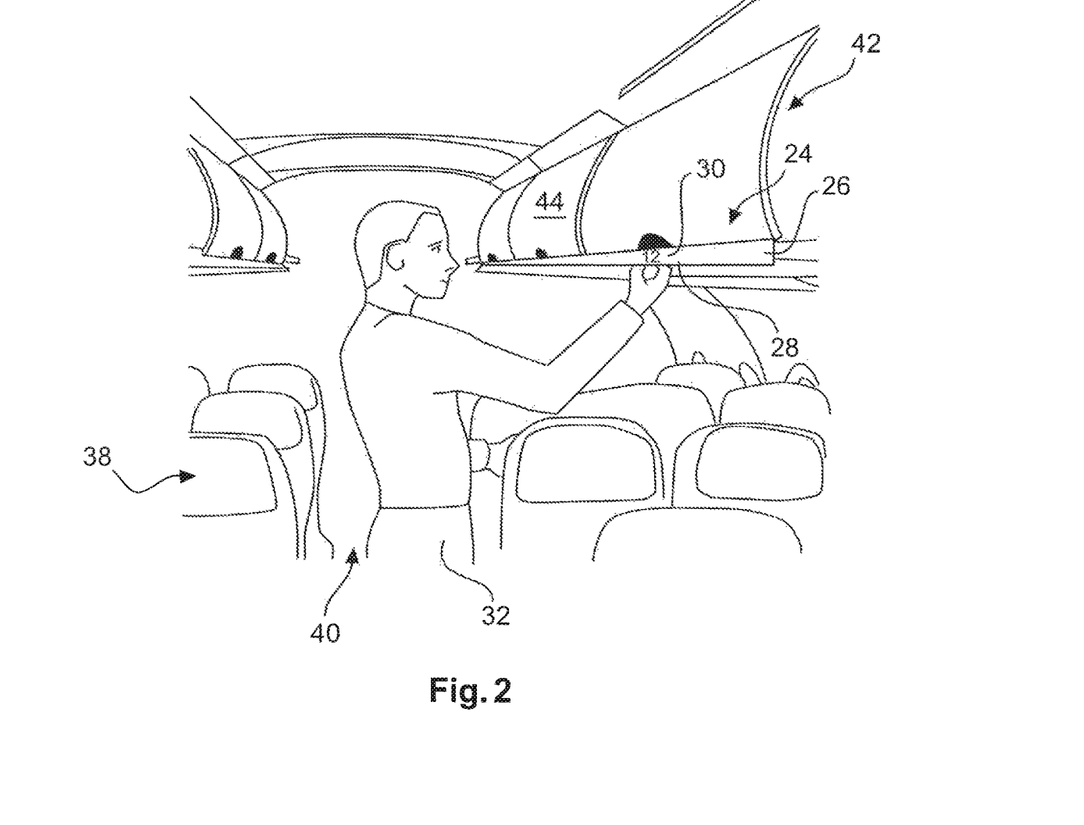
FIG. 2 shows a perspective view of an interior of a vehicle with a further example of a vehicle guidance system.

FIG. 1 shows a vehicle guidance system 10 for guiding visually impaired passengers on-board a vehicle in a cross-section through an interior space 12 on-board the vehicle with at least one cabin zone 14. The system 10 comprises at least one movement area 16 and at least one seating zone 18, located in the cabin interior space 12. It is noted that the interior space 12 is schematically enclosed with a frame 20, which is only indicating an enclosing surface, but which is not meant to be restricted to the particular square surrounding frame 20. The seating zone 18 is shown with a plurality of passenger seats 22, as an option. According to the invention, at least one guiding handrail 24 is provided that is mounted at least along a part of the cabin zone 14 in the vicinity of the movement area 16. The guiding handrail 24 is a tactile guide 26, along which a passenger can be guided for movement within the cabin zone 14 by a touching contact with the guiding handrail 24. The guiding handrail is provided with visually highlighted information 28 (see also FIG. 2) related to cabin information. The guiding handrail is also provided with manually touchable information 30, as also indicated in FIG. 2, and further explained in relation with FIG. 3, related to cabin information. As can be seen, the guiding handrail 24 is mounted above the seating zone 18. The guiding handrail is mounted within reach of a passenger present in the adjacent movement area, as exemplarily shown with a passenger 32 in FIG. 2.

Figure 3:
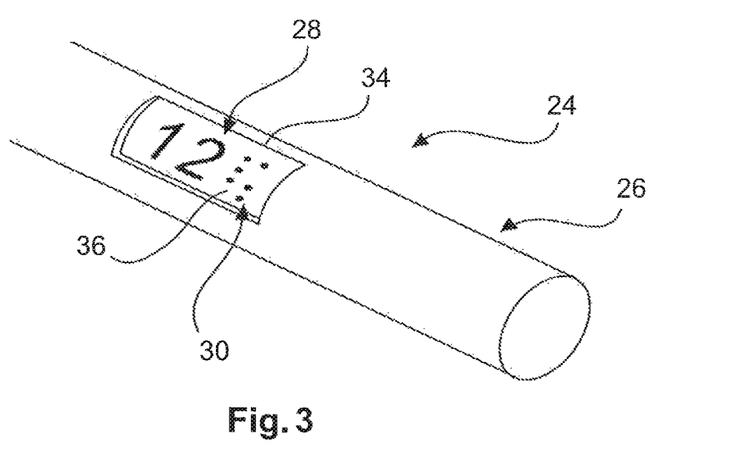
FIG. 3 shows a detailed perspective view of an example of a guiding handrail/guiding sanitary handrail.

In FIG. 3, a section of the guiding handrail 24 is schematically shown with the visually highlighted information 28, for example a number "12" shown in a first colour on a background portion 34 with another colour, which two colours are providing a strong contrast in a visual sense, for example by providing two complementary colours. Further, the manually touchable information 30 is provided, for example, with a relief structure 36, for example a coded relief, such as the Braille system. Alternatively, the information 28, for example the number "12", is made as a relief itself. Thus, the guiding handrail 24 serves as a longitudinal touchable surface that the user can grasp while moving along the movement area 16, and the user is able to visually perceive the location of information and can then have a closer look, or can then feel in case of a very reduced eyesight or in case of even blindness, in a tactile way, perceiving the information provided by the contoured surface, providing the manually touchable information 30.

In an example, the seating zone 18 comprises a seating arrangement 38, as already indicated in FIG. 1 and further shown in FIG. 2. The seating arrangement 38 comprises a plurality of seat rows and columns and at least one longitudinally arranged aisle 40. An overhead compartment arrangement 42 is provided with a plurality of stowage receptions arranged above at least a part of the seating arrangement 38. The guiding handrail is provided above the seating zone along a front edge 44 of an overhead compartment arrangement facing towards the movement area. For example, the guiding handrail is mounted to the overhead compartment.

Figure 4:
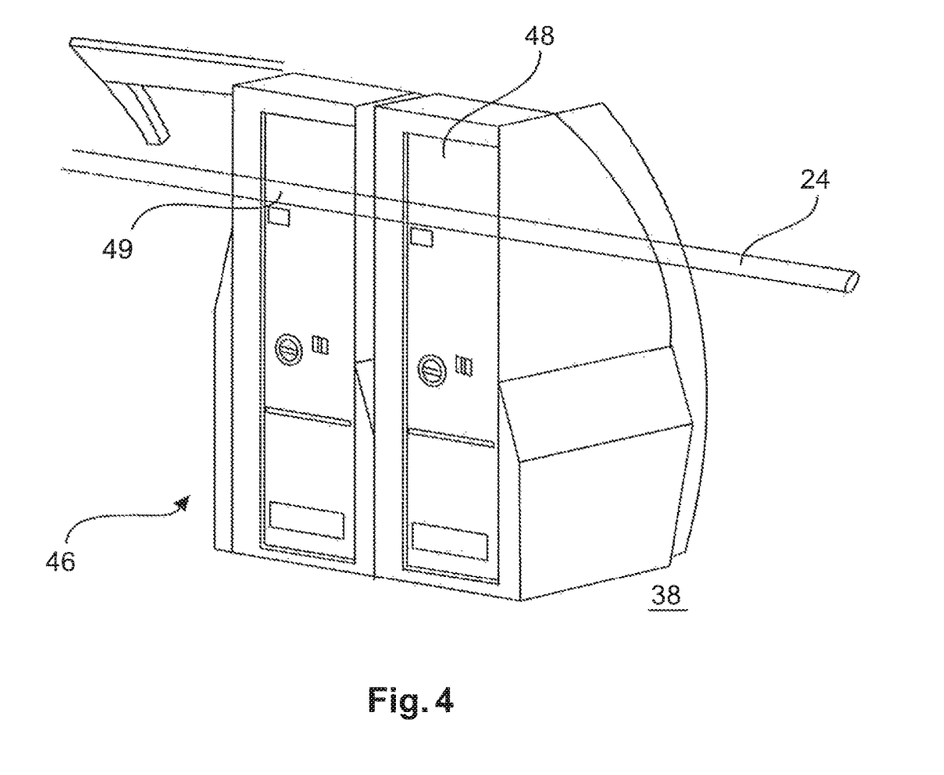
FIG. 4 shows a perspective view of a further example of a vehicle guidance system along other cabin interior elements.

In a further example, as shown in FIG. 4, the guiding handrail 24 is also provided at further surfaces 46 of other cabin interior elements, such as lavatories or other monuments for stowage purposes, which further surfaces 46 are facing towards the movement area. In the example shown in FIG. 4, the seating zone 18 may be arranged next to the monuments shown on the right side, and the guiding handrail 24 coming from the zone of the overhead compartment arrangement is then continued along door surfaces 48 in the same or nearly the same height, providing a continued guiding handrail 49. Thus, the guiding handrail 24 can be mounted in vicinity and along the whole length of the movement area 16.

Figure 5:
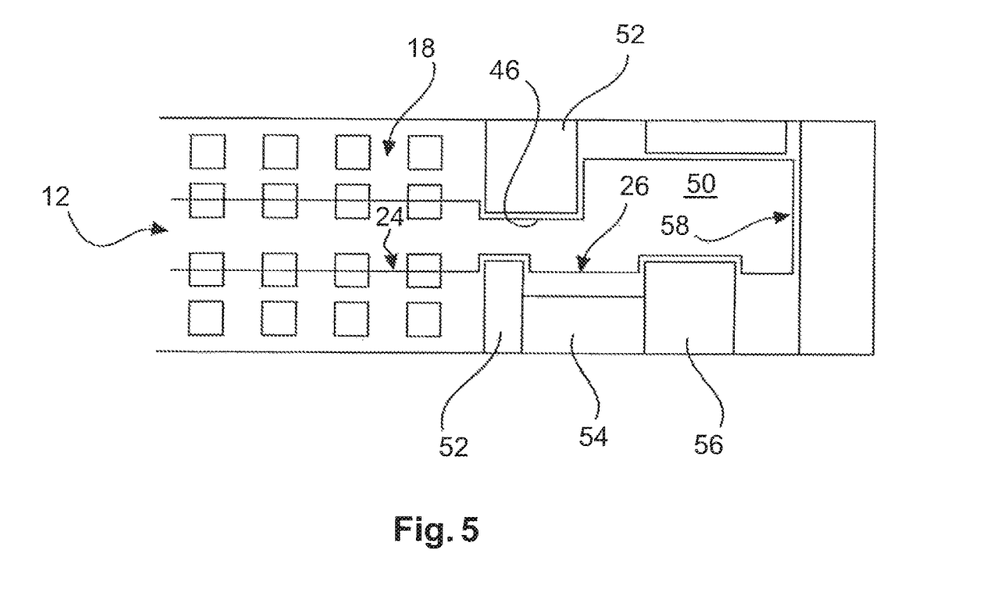
FIG. 5 shows a schematic plan view of a further example of the vehicle guidance system with a continuous tactile guide.

FIG. 5 shows a further example, wherein the interior space 12, shown in a schematic plan view in FIG. 5, comprises a service zone 50 with movement areas, wherein the service zone comprises at least one of the group of on-board kitchen areas, toilets, washrooms, restrooms, and monuments. For example, restrooms, also referred to as lavatories 52, are provided in an area adjacent to the seating area or seating zone 18. Further, a service area may comprise different shelf portions 54 and stowage compartments 56, also called monuments. Thus, the service zone 50 may be provided as a contoured service zone with respect to the geometric figure in the plan view. Nevertheless, the guiding handrail 24 is provided, as described above, above the seating zone 18, as well as along the lavatories 52 and the further interior structure or along the service zone 50. In the example shown, the tactile guide 26 of the handrail 24 is provided as a continuous tactile guide 58 throughout the cabin space.

Figure 6:
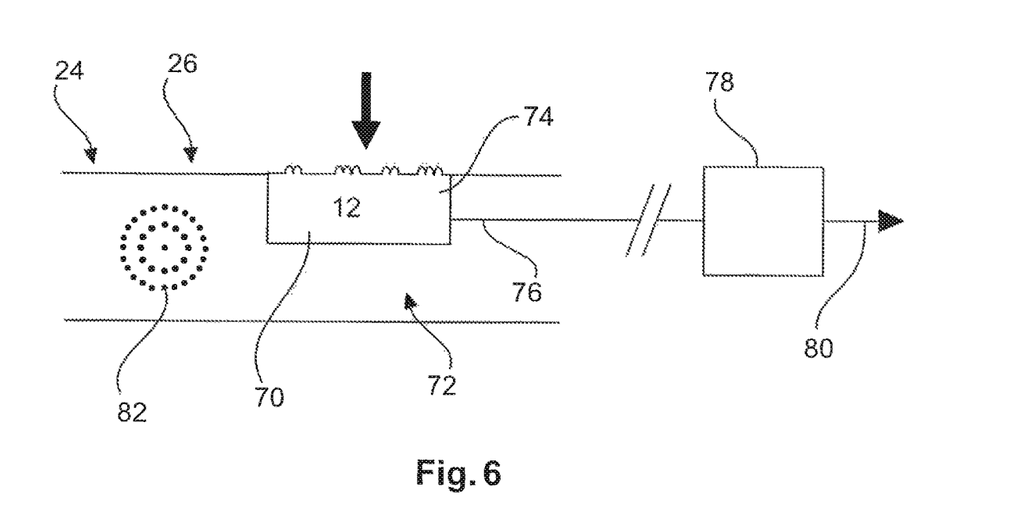
FIG. 6 shows a schematic detailed view of a vehicle guidance system provided with a user interface with an actuator and an output unit.

FIG. 6 shows a detailed section of the tactile guide 26 of the handrail 24, wherein a location indicator 70 is provided on the guiding handrail 24 as a user interface 72 provided with an actuator 74 that can be manually activated by the passenger. Upon activation, the user interface 72 provides a predetermined signal 76 to an output unit 78 providing assigned additional information 80 to the passenger. The signal 76 can be transferred wirelessly or wire-bounded. The output unit 80 may be provided as a loudspeaker (not further shown in detail), wherein the loudspeaker is provided as an on-board loudspeaker in the close vicinity of the actuator 74, for example arranged integrated with the handrail 24, as indicated by a number of little holes 82 in case of an inserted small loudspeaker.

In a further example (not further shown), the loudspeaker is provided as a part of a passenger's hearing aid, and/or by a passenger's personal handheld communication device. For example, a predetermined wireless communication between a hearing aid and an on-board system may be provided for transmitting respective signals to the hearing aid in order to generate a respective acoustic signal, for example a tone, or a number of tones such as a melody or spoken language. A personal handheld communicates device may be a smartphone.

As also indicated in FIG. 6, the guiding handrail 24 is provided as a handhold for passengers in an example.

Figure 7:
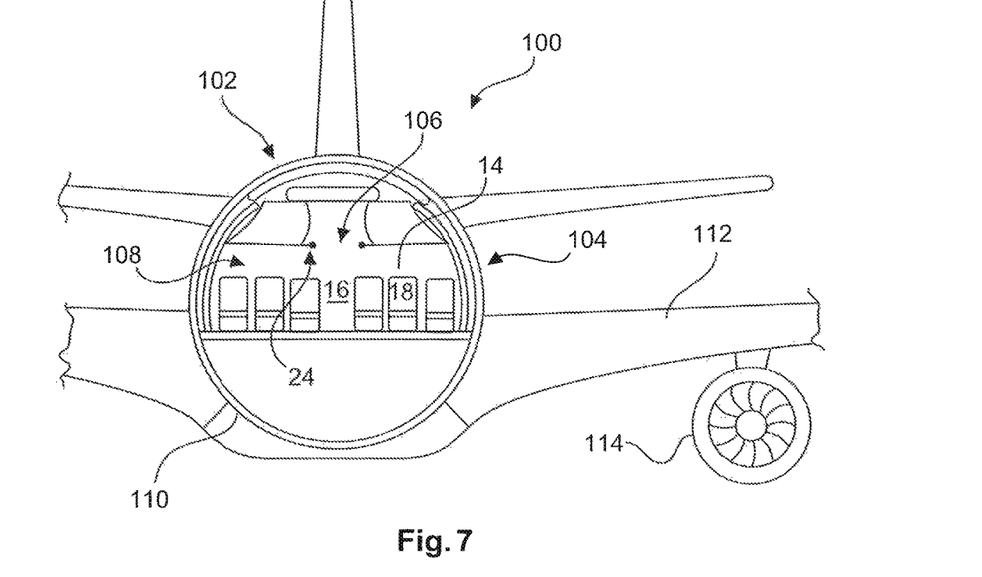
FIG. 7 shows a schematic cross-section through an aircraft as an example for a vehicle.

FIG. 7 shows a vehicle 100 in form of a schematic cross-section through an aircraft 102. The vehicle 100 comprises a vehicle structure 104, a cabin arrangement 106 provided by the vehicle structure 104, and a guidance 108 for visually impaired passengers on-board the vehicle 100. The guidance 108 is provided as a vehicle guidance system according to one of the above described examples. The at least one cabin zone 14 with the at least one movement area 16 is provided by the cabin arrangement 106. As can be seen, the guidance 108, provided as the vehicle guidance system 10 comprises the guiding handrail 24 arranged above the seating zone 18.

In an example, the vehicle is an aircraft, such as the passenger aircraft 102, as indicated in FIG. 7, comprising a fuselage structure 110 enclosing at least one cabin space, i.e. the interior space 12. It must be noted that FIG. 7 further shows a wing structure 112, as well as an aircraft engine 114. It must be noted that FIG. 7 shows the aircraft 110 as an example for the vehicle 100. In another example (not further shown), the vehicle is a coach (bus), or railway carriage, or tram/streetcar, or ship such as a ferry. Therefore, the vehicle 100 provided as the aircraft 102 in FIG. 7 is shown as an option, and is not meant as a limitation to restrict the vehicle to an aircraft. Rather, the above-mentioned different types of vehicles are also provided.

Figure 8:
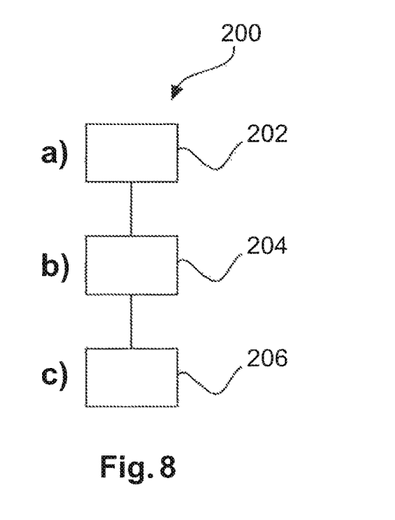
FIG. 8 shows basic steps of an example of a method for guiding visually impaired passengers on-board a vehicle.

FIG. 8 shows a method 200 for guiding visually impaired passengers on-board a vehicle, comprising the following steps:

In a first step 202, a guiding handrail is provided in a cabin space of a vehicle at least along a part of a cabin zone in the vicinity of a movement area. The guiding handrail is a tactile guide with visually highlighted and manually touchable information related to cabin information. The guiding handrail is mounted above a seating zone. The guiding handrail is mounted within reach of a passenger present in the adjacent movement area.

In a second step 204, the guiding handrail is touched by a passenger.

In a third step 206, the passenger is perceiving the information related to cabin information by manual sensing, whereby the guiding information is provided to the user.

The first step 202 is also referred to as step a), the second step 204 as step b), and the third step 206 as step c).

Figure 9:
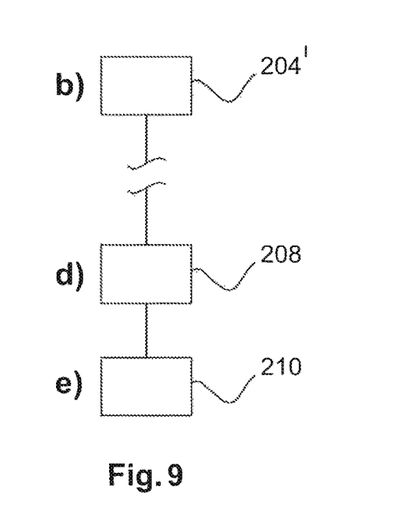
FIG. 9 shows a further example of the method of FIG. 8.

FIG. 9 shows a further example of the method, wherein in step b), the passenger feels and manually activates a user interface provided by an actuator on the guiding handrail. This is indicated by reference number 204'. Further, a step d), indicated with reference number 208, is provided, in which, upon activation, the user interface is providing a predetermined signal to an output unit. Further, a step e), indicated with reference number 210, is provided, in which the output unit is providing assigned additional information to the passenger.

According to an aspect of the present invention, a cabin space in an aircraft, or other type of interior space in a vehicle acting as a cabin zone, is provided considering the needs of visually impaired passengers. Since visually impaired passengers are the second-largest group among persons with reduced mobility (PRMs), this provides improvement also for a large number of passengers, for example in order to find their seats in a shorter time or with reduced stress. Thus, a reduction of boarding time can be achieved. The guiding handrail is provided in an example with visually, optical contrast and the information can thus be provided visually, and also in a haptic manner by touching the information. Further, also an acoustic transmission of the information can be provided, for example by a loudspeaker also in the passenger service unit or others. In an example, the guiding handrail is provided as an illuminated handrail, which further provides orientation also for other passengers, for example during night or during darkened cabin situations.

Visually impaired passengers, provided with a reduction of one of their senses, or channel of sense, i.e. the visual sense, are provided with information and orientation in other forms, for example besides the haptic information aid, also as in form of an auditory information aid.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A vehicle guidance system for guiding visually impaired passengers on-board a vehicle, comprising:
    an interior space on-board the vehicle with at least one cabin zone;
    at least one movement area and at least one seating zone located in the cabin interior space; and
    at least one guiding handrail provided as a handhold for passengers;
    wherein the guiding handrail is mounted at least along a part of the cabin zone in the vicinity of the movement area;
    wherein the guiding handrail is a tactile guide, along which a passenger can be guided for movement within the cabin zone by a touching contact with the guiding handrail, the tactile guide being provided as a continuous tactile guide throughout the cabin zone;
    wherein the guiding handrail is provided with visually highlighted information related to cabin information;
    wherein the guiding handrail is provided with manually touchable information related to cabin information;
    wherein the guiding handrail is mounted above the seating zone;
    wherein the guiding handrail is mounted within reach of a passenger present in the adjacent movement area;
    wherein the visually highlighted information and the manually touchable information each comprise seat/row numbers and at least one of: location information for special functions, including where cushions or newspapers are stored, and direction indicators for service areas, including restrooms, bar or kitchen areas, sleeping compartments, or restaurants, and wherein the visually highlighted information and the manually touchable information both relate to the same cabin information and both are arranged on the guiding handrail.

2. The vehicle guidance system according to claim 1, wherein:

the seating zone comprises a seating arrangement with a plurality of seat rows and columns and at least one longitudinally arranged aisle; and an overhead compartment arrangement is provided with a plurality of stowage receptions arranged above at least a part of the seating arrangement;

wherein the guiding handrail is provided above the seating zone along a front edge of an overhead compartment arrangement facing towards the movement area.

3. The vehicle guidance system according to claim 1, wherein the guiding handrail is provided at surfaces of other cabin interior elements, which surfaces are facing towards the movement area.

4. The vehicle guidance system according to claim 1, wherein the guiding handrail is mounted in vicinity and along the whole length of the movement area.

5. The vehicle guidance system according to claim 1, wherein the interior space further comprises a service zone with movement areas, wherein the service zone comprises at least one of the group of on-board kitchen areas, toilets, washrooms, restrooms, and monuments; and wherein the guiding handrail is provided at wall surfaces along a part of the movement areas of the service zone as a continuation of the guiding handrail along the seating zone.

6. The vehicle guidance system according to claim 5, wherein the guiding handrail is provided within the service zones at least within at least one of the group of the on-board kitchen areas, toilets, washrooms and restrooms.

7. The vehicle guidance system according to claim 1, wherein a location indicator on the guiding handrail is provided as a user interface provided with an actuator that can be manually activated by the passenger; and wherein, upon activation, the user interface provides a predetermined signal to an output unit providing assigned additional information to the passenger.

8. The vehicle guidance system according to claim 7, wherein the output unit is a loudspeaker providing acoustic information in addition to the visual and tactile information; wherein the loudspeaker is provided:

i) as an on-board loudspeaker in the close vicinity of the actuator;

ii) as a part of a passenger's hearing aid; and/or by a passenger's personal handheld communication device.

9. A vehicle comprising:

a vehicle structure;

a cabin arrangement provided by the vehicle structure; and a guidance for visually impaired passengers on-board the vehicle;

wherein the guidance comprises a vehicle guidance system comprising:

an interior space on-board the vehicle with at least one cabin zone;

at least one movement area and at least one seating zone located in the cabin interior space; and at least one guiding handrail provided as a handhold for passengers;

wherein the guiding handrail is mounted at least along a part of the cabin zone in the vicinity of the movement area;

wherein the guiding handrail is a tactile guide, along which a passenger can be guided for movement within the cabin zone by a touching contact with the guiding handrail, the tactile guide being provided as a continuous tactile guide throughout the cabin zone;

wherein the guiding handrail is provided with visually highlighted information related to cabin information;

wherein the guiding handrail is provided with manually touchable information related to cabin information;

wherein the guiding handrail is mounted above the seating zone;

wherein the guiding handrail is mounted within reach of a passenger present in the adjacent movement area;

wherein the at least one cabin zone with the at least one movement area is provided by the cabin arrangement; and wherein the visually highlighted information and the manually touchable information each comprise seat/row numbers and at least one of: location information for special functions, including where cushions or newspapers are stored, and direction indicators for service areas, including restrooms, bar or kitchen areas, sleeping compartments, or restaurants, and wherein the visually highlighted information and the manually touchable information both relate to the same cabin information and both are arranged on the guiding handrail.

10. The vehicle according to claim 9, wherein the vehicle is a passenger aircraft, comprising a fuselage structure enclosing at least one cabin space.

11. A method for guiding visually impaired passengers on-board a vehicle, comprising:

a) providing a guiding handrail as a handhold for passengers in a cabin space of a vehicle at least along a part of a cabin zone in the vicinity of a movement area; wherein the guiding handrail is a tactile guide with visually highlighted and manually touchable information related to cabin information, the tactile guide being provided as a continuous tactile guide throughout the cabin zone; wherein the guiding handrail is mounted above a seating zone; and wherein the guiding handrail is mounted within reach of a passenger present in the adjacent movement area;

b) touching of the guiding handrail by a passenger; and c) perceiving the information related to cabin information by manual sensing thereby providing guiding information;

wherein the visually highlighted information and the manually touchable information each comprise seat/row numbers and at least one of: location information for special functions, including where cushions or newspapers are stored, and direction indicators for service areas, including restrooms, bar or kitchen areas, sleeping compartments, or restaurants, and wherein the visually highlighted information and the manually touchable information both relate to the same cabin information and both are arranged on the guiding handrail.

12. The method according to claim 11, wherein, in step b), the passenger feels and manually activates a user interface provided by an actuator on the guiding handrail; the method further comprising: upon activation, the user interface is providing a predetermined signal to an output unit; and the output unit is providing assigned additional information to the passenger.

* * * * *